United States Patent
Volker

(10) Patent No.: US 9,737,861 B2
(45) Date of Patent: Aug. 22, 2017

(54) MIXING SYSTEMS FOR READY-TO-USE FLUSH SOLUTIONS

(71) Applicant: Manfred Volker, Blankenbach (DE)

(72) Inventor: Manfred Volker, Blankenbach (DE)

(*) Notice: Subject to any disclaimer, the term of this patent is extended or adjusted under 35 U.S.C. 154(b) by 0 days.

(21) Appl. No.: 14/950,248

(22) Filed: Nov. 24, 2015

(65) Prior Publication Data

US 2016/0220971 A1    Aug. 4, 2016

(30) Foreign Application Priority Data

Nov. 25, 2014 (DE) .................. 10 2014 017 399

(51) Int. Cl.

| A61L 2/00 | (2006.01) |
| B01D 11/04 | (2006.01) |
| B01D 61/00 | (2006.01) |
| B01D 15/00 | (2006.01) |
| B01F 3/08 | (2006.01) |

(Continued)

(52) U.S. Cl.
CPC ................. B01F 3/088 (2013.01); A61J 3/00 (2013.01); B01F 15/00025 (2013.01); B01F 15/00272 (2013.01); B01F 15/0227 (2013.01); C02F 1/008 (2013.01); C02F 1/441 (2013.01); B01F 2003/0896 (2013.01); B01F 2215/0034 (2013.01); C02F 1/02 (2013.01); C02F 1/38 (2013.01); C02F 1/48 (2013.01); C02F 1/487 (2013.01); C02F 2103/026 (2013.01); C02F 2201/008 (2013.01); C02F 2209/02 (2013.01); C02F 2209/05 (2013.01); C02F 2209/29 (2013.01); C02F 2209/40 (2013.01); C02F 2209/42 (2013.01); C02F 2303/04 (2013.01)

(58) Field of Classification Search
CPC ........ C02F 1/78; B01D 65/02; B01F 15/0227; A61B 1/125; A61B 90/70
USPC ...... 422/255–256, 292; 210/192, 198.1, 636, 210/96.2
See application file for complete search history.

(56) References Cited

U.S. PATENT DOCUMENTS

| 6,096,007 A * | 8/2000 | Haan ................... A61M 3/0233 |
| | | 222/95 |
| 7,635,359 B2 | 12/2009 | Nakazawa et al. |
| 2011/0042202 A1* | 2/2011 | Pettee ....................... A61L 2/22 |
| | | 204/228.2 |

FOREIGN PATENT DOCUMENTS

| DE | 1955538 | 12/1966 |
| DE | 3315031 A1 | 1/1985 |

(Continued)

Primary Examiner — Monzer R Chorbaji
(74) Attorney, Agent, or Firm — Greer, Burns & Crain, Ltd.

(57) ABSTRACT

The mixing system for ready-to-use flush solutions is characterized by an RO system, a mixing unit that is connected to the RO system and that contains a mixing chamber, to which high-purity water can be fed from the RO system and flush solution concentrate can be fed from a concentrate source, and a flush solution link connector, wherein the RO system and the mixing unit form a filling station, a mobile flush solution container that contains a pressurized container that receives a flush solution bag that can be coupled to the flush solution link connector of the mixing unit, and a computer and control mechanism for all measurement and monitoring tasks during the local production of a flush solution, wherein the mobile flush solution container and the filling station are provided with sensors by means of which wireless communication is made possible between the mobile flush solution container and the filling station.

13 Claims, 9 Drawing Sheets

(51) Int. Cl.
*A61J 3/00* (2006.01)
*B01F 15/00* (2006.01)
*B01F 15/02* (2006.01)
*C02F 1/44* (2006.01)
*C02F 1/00* (2006.01)
C02F 103/02 (2006.01)
C02F 1/02 (2006.01)
C02F 1/38 (2006.01)
C02F 1/48 (2006.01)

(56) References Cited

FOREIGN PATENT DOCUMENTS

| | | |
|---|---|---|
| DE | 4121568 A1 | 10/1992 |
| DE | 4122171 A1 | 1/1993 |
| DE | 4137748 A1 | 5/1993 |
| DE | 4332070 A1 | 3/1995 |
| DE | 69318988 T2 | 3/1996 |
| DE | 19538818 | 4/1997 |
| DE | 19733278 A1 | 2/1999 |
| DE | 102009057562 A1 | 6/2011 |
| DE | 102010055781 A1 | 6/2012 |
| DE | 102011102662 A1 | 11/2012 |
| DE | 102012001879 A1 | 8/2013 |
| EP | 2689790 | 7/2012 |
| EP | 2674399 | 12/2013 |
| WO | 2005077335 A1 | 8/2005 |

* cited by examiner

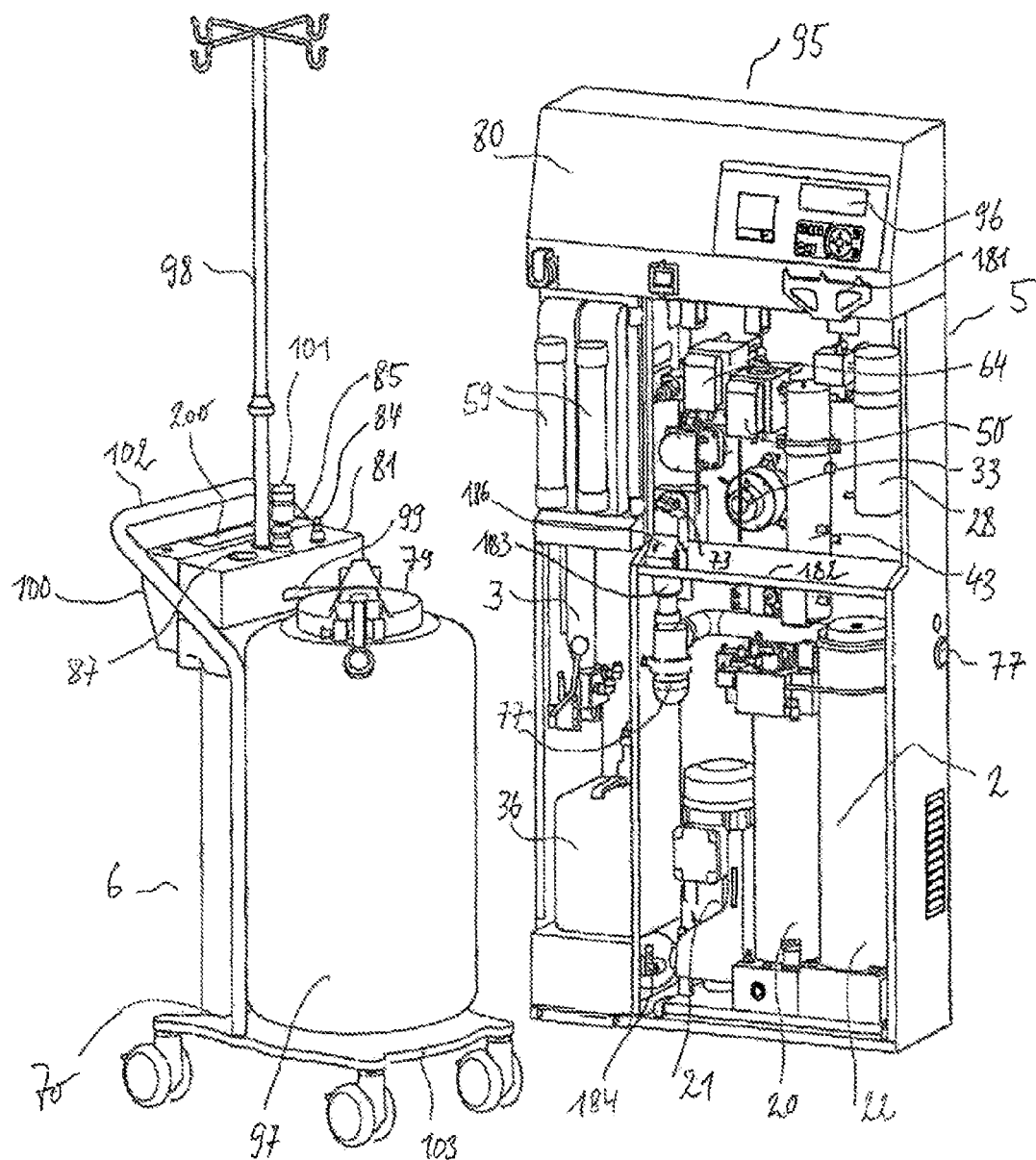
Fig. 3a                    Fig. 3b

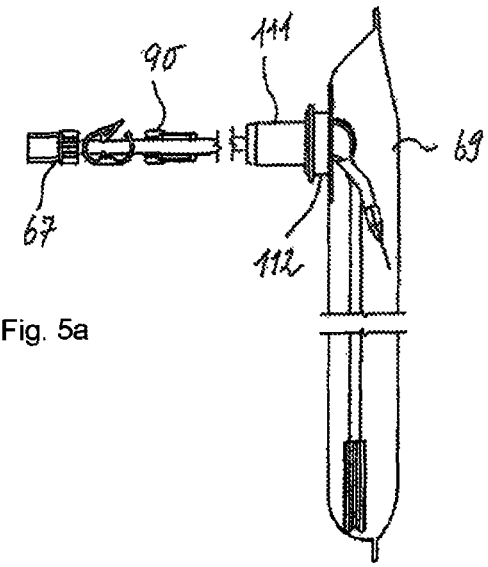
Fig. 5a
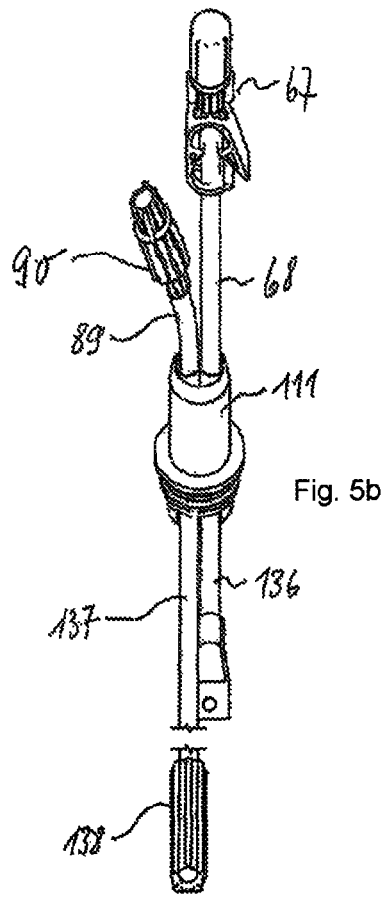
Fig. 5b
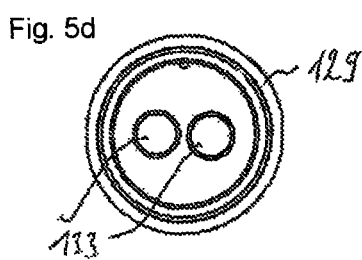
Fig. 5d
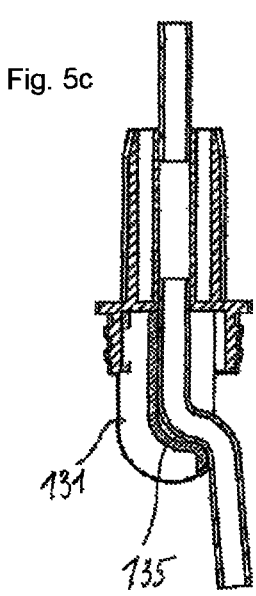
Fig. 5c
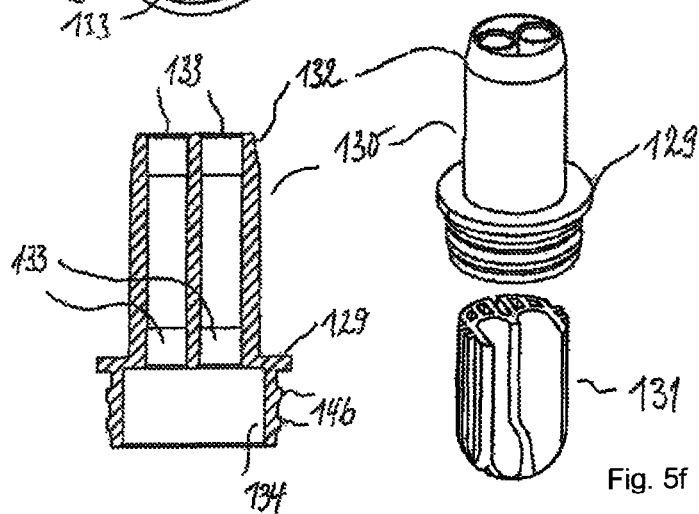
Fig. 5e
Fig. 5f

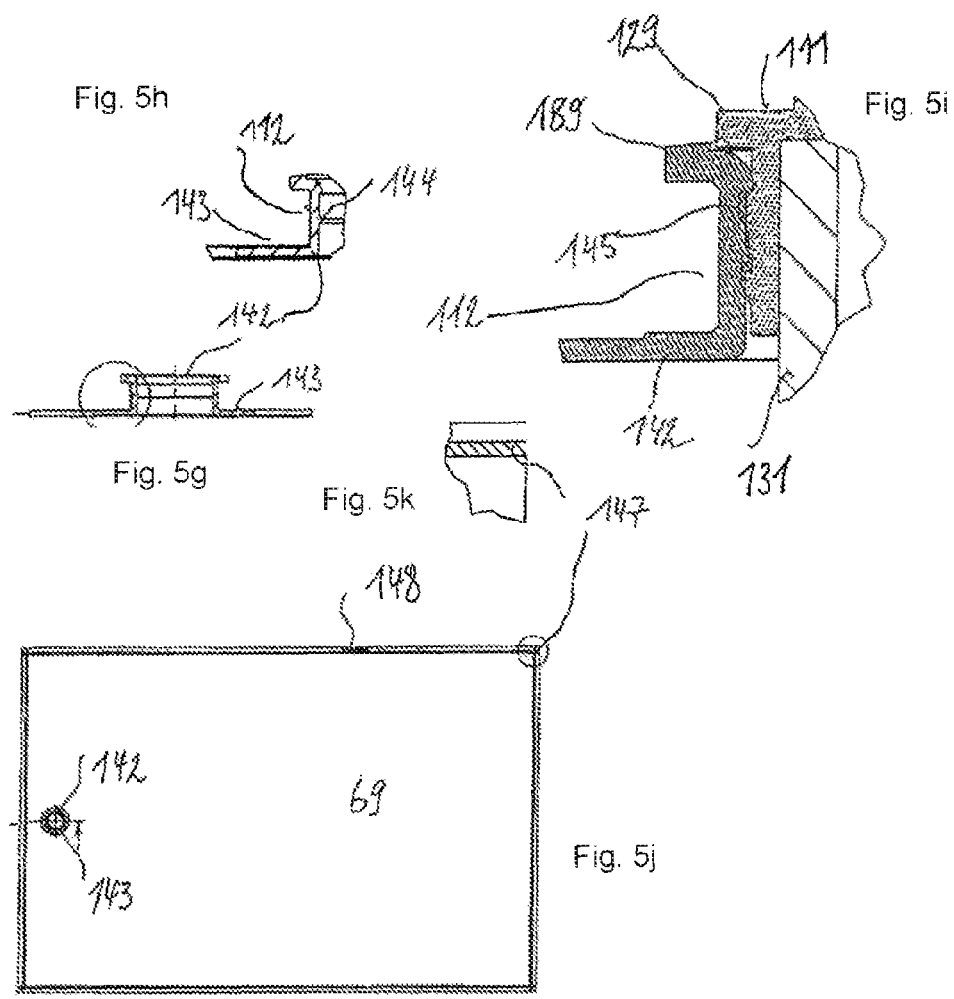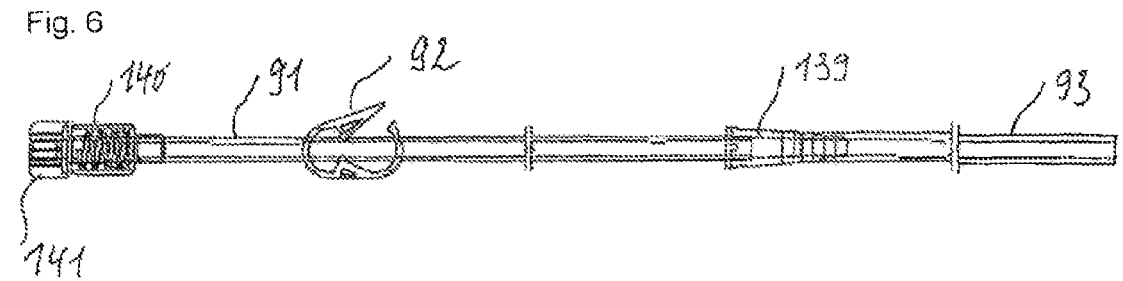

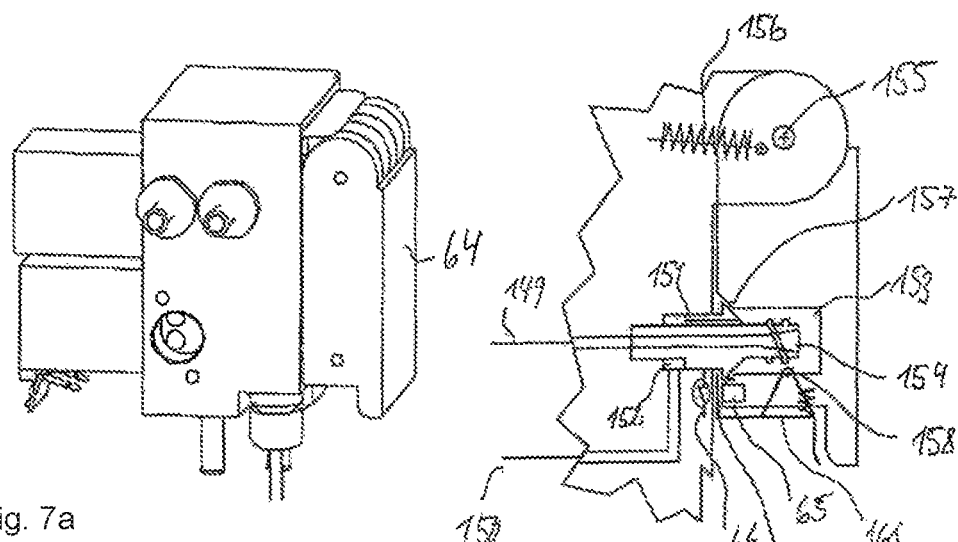
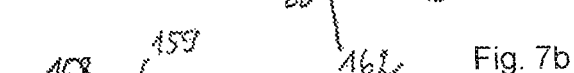
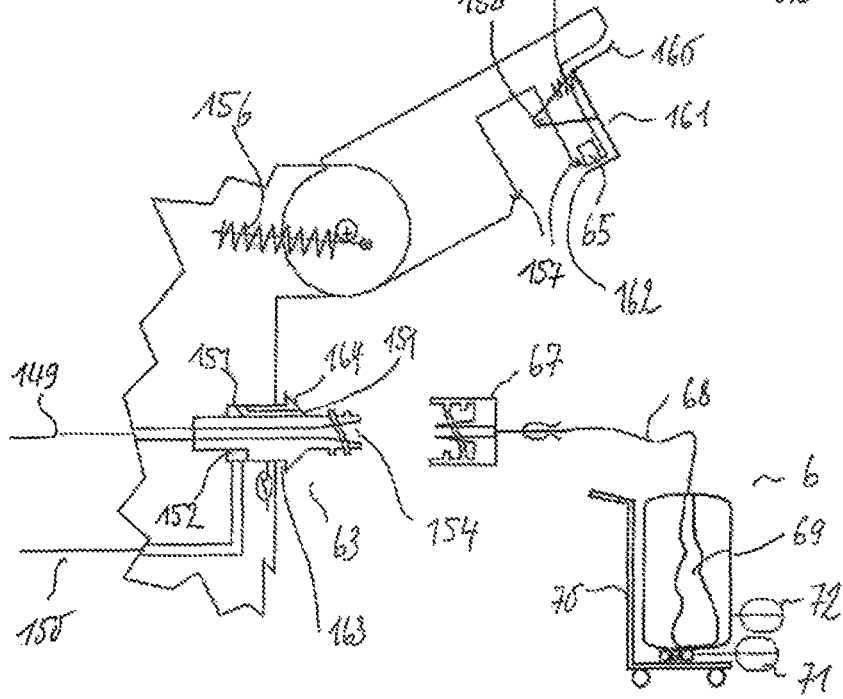
Fig. 7a
Fig. 7b
Fig. 7c

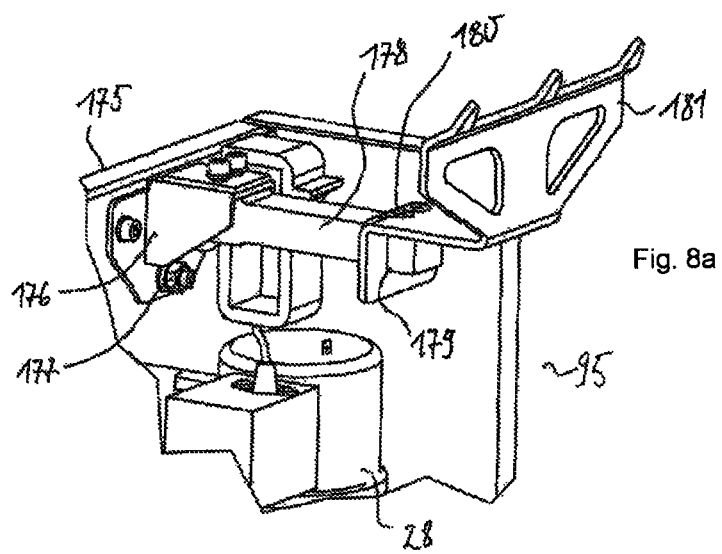
Fig. 8a
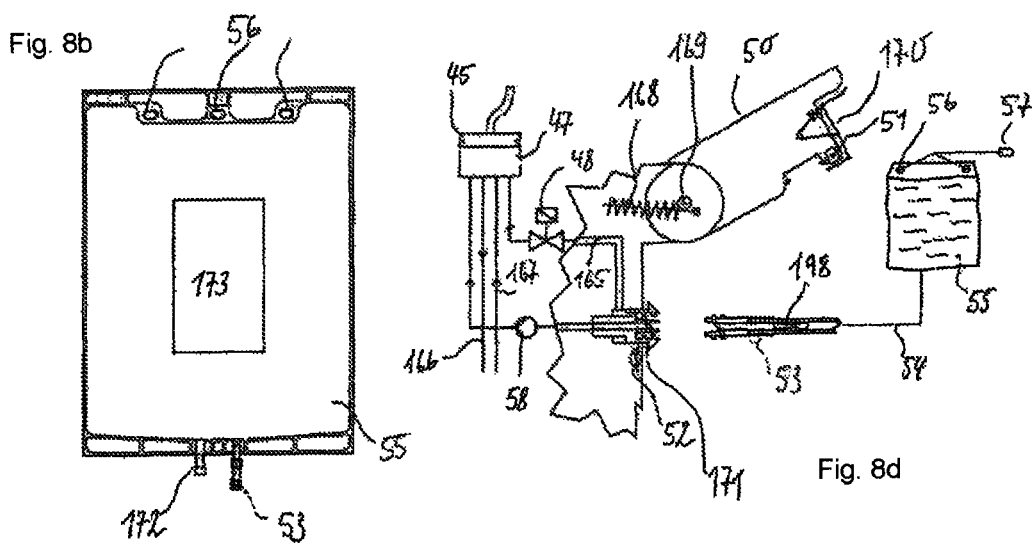
Fig. 8b
Fig. 8d
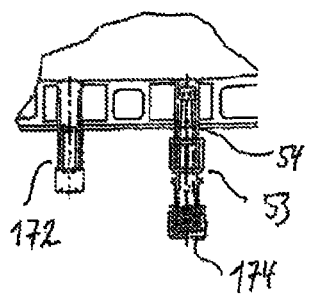
Fig. 8c

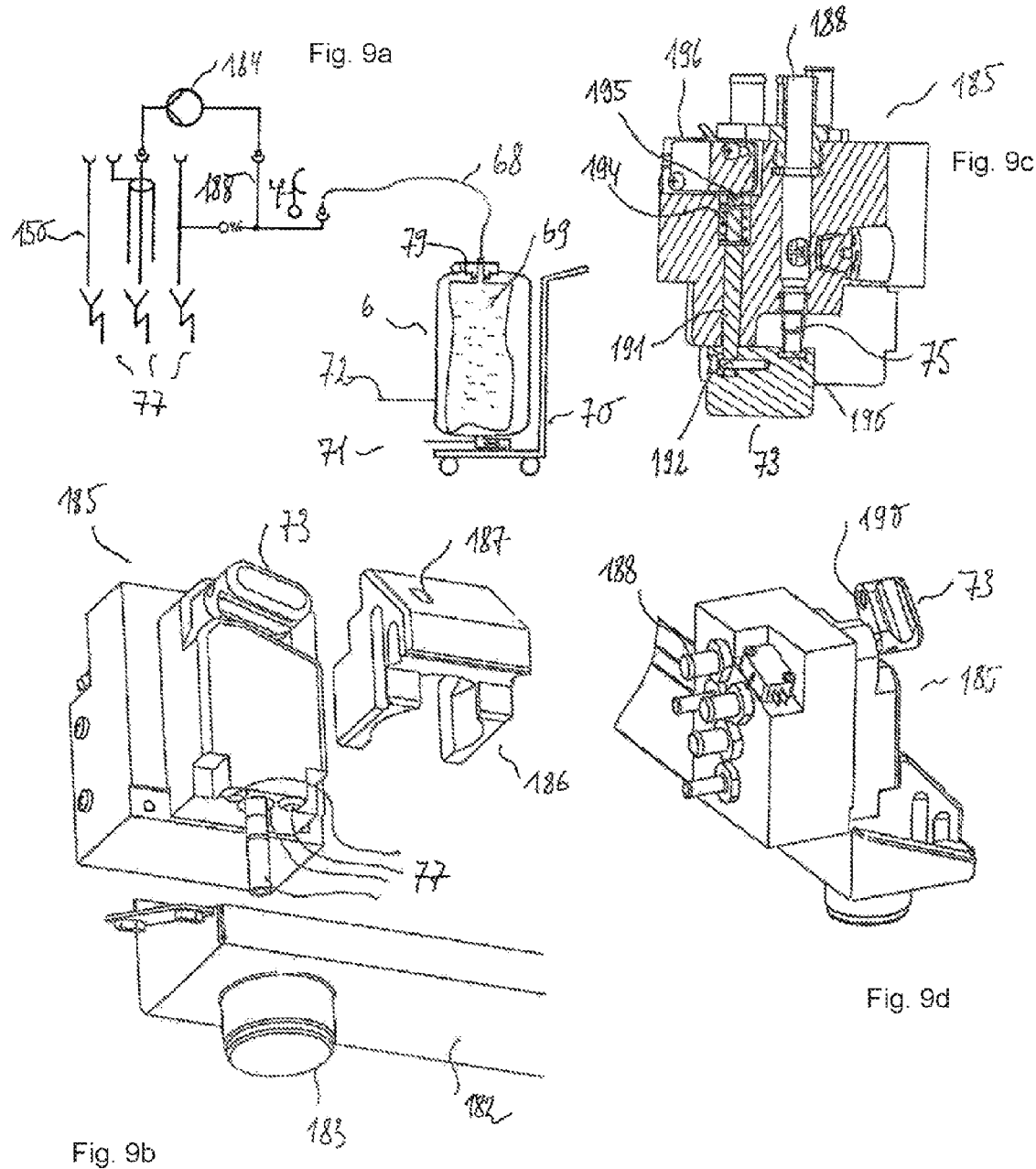

MIXING SYSTEMS FOR READY-TO-USE FLUSH SOLUTIONS

FIELD OF THE INVENTION

The subject application relates to medical flushing solutions, and more particularly to a mixing system for ready-to-use flush solutions.

SUMMARY OF THE INVENTION

The objective of this development is to produce from tap water, through the use of filter technology, an economical, chemically and microbiologically high-purity fluid as a base substance for the use of medical flush solutions locally in a decentralized manner and to mix the same with a concentrate in such a manner that larger volumes of ready-to-use flush solutions are created that can be movably brought to the place of use and applied by means of pressurization.

In this process both flush solutions for endoscopic and general surgical operations, e.g., in gynecology, urology, arthroscopy through the use of Purisole, Ringers, common salt concentrates, and also flush solutions for the relief of chronic illnesses or for therapeutic applications can be produced.

An application of this development to other areas such as, e.g., veterinary medicine, in the laboratory or in biology and pharmaceutics as a high-purity flush fluid or also as a base medium for the production of medicines, cell cultures and the like is conceivable and practicable.

As a rule, medical flush solutions are further processed into flush solutions in a central production process, taking as a base substance distilled water that is produced in a central process, whereby the flush solutions must then be brought to the place of use with considerable logistics costs.

The regulative and normative requirements regarding the quality of the base substance water are thereby so high that until now it has not been possible to produce verifiable flush solutions locally, e.g., in a hospital, as needed.

On the one hand, it is the high microbiological requirements and, on the other hand, the necessary chemical requirements placed on the base substance water that stand in the way of verifiable and demonstrable, normative quality requirements of the local demand-driven production.

Although laboratory water devices on the basis of reverse osmosis are available to produce fluid with high chemical and microbiological purity, the lack of prevention for germ reduction and a non-verifiable test of the filtering stages involved must be seen as a disadvantage.

For medical use, for example, industrially produced flush solutions with 3 l, 5 l and 10 l volumes are provided to the hospital and temporarily or permanently stored with large in-house, staff logistics operations.

These bag volumes are not sufficient for the duration of the operation or examination, for example, for bladder surgery with approximately 60-l flush fluid, so that a relief-person must be available outside the central OP area in order to provide, heat and hand over the bags.

Application is effected to some extent gravimetrically or also with pressure infusion cuffs. In addition, often expensive disposal articles such as, for example, pump segments are required or also such articles are required for the bag warmers.

A crucial disadvantage, e.g., during endoscopic examinations, is the inability to see through free-floating tissue or pulsing flush fluid, because, for example, the required flush fluid pressure between 0.1 bar and 0.3 bar is not kept constant.

Generous flushing is necessary for an improvement in wound hygiene. This results in both personnel and material costs.

The decentralized production of medical flush solutions by hospital personnel demands reliable sequences both in the operation and also in the dependability of the technology with respect to the flush solution quality.

Necessary improvements, purpose and object of this invention are therefore the economical, user-friendly local production of a flush solution with low personnel deployment and a flush volume consistent with the examination or also with a plurality of operations.

Special significance is given to the uninterrupted application without additional personnel expenditures subject to application temperature and hygiene of the solution with the lowest microbiological and chemical contamination permitted according to the norms without additional controls at the place of use.

A space-saving technology for the production of the flush solution and a mobile flush solution container should thereby be used, whereby said flush solution container contains the essential components for high hygiene, safety, simple operation and a constant flow and pressure for the application of the flush fluid.

It should be as simple as possible to dispose of residual quantities.

High availability of the devices during all measuring and monitoring tasks with respect to their intrinsic safety and an only remote failure probability are important in order under all circumstances to avoid a catastrophic effect for the patient and perfectly to monitor the quality or also toxicity of the created fluid in the guaranteed acceptance criteria.

In addition, it is difficult to diagnose the filtering stage, preferably used as reverse osmosis membrane, for the retention of the chemical constituents with respect to possible minimum ruptures.

A conductivity measurement as the sole verification of an osmosis membrane, such as is used in the state of the art, is not sufficient.

Normally, germ reduction in water-bearing systems is performed physically and/or also chemically. For reasons of toxicity, verification control after chemical disinfection requires a major effort because the smallest residual concentrations can lead to serious patient injuries.

Furthermore, the use of chemicals or biocides results in the contamination of waste water.

Ideally, a combination of thermal and chemical should be selected in order to achieve both a cleaning effect and a disinfecting one.

Due to the high efficacy that this produces, a lower temperature would be required and the concentration of the chemical agent could be lower. However practice shows significant difficulties with respect to the transmembrane flow of a chemothermal cleaning solution from the primary to the secondary side of the reverse osmosis membrane, because the high osmotic pressure opposes the transmembrane pressure.

Due to the aforementioned difficulties, in practice often filters with lower service lives are therefore used that must be replaced after short-term use.

This object is effectively solved according to the invention by means of using the combination of a reverse osmosis membrane and two additional filter stages, for example, ultra or sterile filters, preferably as capillary membrane, for the production of the flush solution.

This filter combination and further constituents are called the filling station in the following.

For example, for the production of approximately 60 l of ready-to-use Purisole solution, approximately 56 l of sterile-filtered permeate is to be proportionally diluted or mixed with approximately 3.6 l of highly concentrated Purisole concentrate in such a manner that the resulting flush solution can be used for intra- and post-operative bladder irrigation without additional testing.

The aforementioned flush solution is representative, e.g., for Ringer's and/or other sodium chloride solutions that can be used particularly in the field of surgery, but also in other medical or named areas, whereby the concentrates and their mixture ratios must be adapted to the specific applications.

Frequently used as a flush solution are, e.g., 0.9% sodium chloride solutions. A concentrate volume of approximately 2.9 l at a ratio of 1:35 is sufficient for the preparation of approximately 100 l of this solution.

Ringer's flush solutions are to be produced with slight deviations from the aforementioned. For example, at a mixing ratio of 1:34.6, 100 l Ringer's solution is to be prepared with approximately 2.872 l Ringer's concentrate.

Increasing the concentration by approximately 30-35 times at a solubility temperature of approximately 10° C. shows the potential savings in logistics, handling and space.

The described method and the components and volumes used are however not reduced to this. A large bandwidth of flush solutions can be produced conditional on the high-purity agents, the exact mixing and dilution.

Advantageously, the germ growth of the concentrate is also virtually prevented due to the high concentration.

For the preparation of the flush solution, the concentrate container, which is advantageously executed as a bag, is hung on the prepared receptacles of the filling station concentrate scale and the mixing process is initiated. First the scale is thereby verified by means of the known bag weight.

The user brings about the filling-station-side links of both the concentrate bag and the still-to-be-described flush solution bag to self-cleaning, fool-proof link connectors of the filling station, which are executed in this application for example as flap solutions, but that can also be executed on the device side as flexible hose line.

With great advantage, a mobile flush solution container which preferably is formed as a pressurized container is equipped with an insertable sterile flush fluid bag that is filled with a correspondingly large volume.

The flush solution bag contains a non-detachable link connector that can be stuck through the locking lid of the pressurized container and fixed in place. The link connector can be provided with continuative flexible hose lines that are formed as filling or transfer lines, whereby the connector can, with advantage, also be executed as only a hose that selectively, and depending on the sterility requirements, can be used as both a filling hose and also as a transfer hose.

For the application of the flush fluid at the place of use, a transition system can, at the transfer link of the flush solution connector, be connected to, for example, an endoscopy system. A link to other systems common in surgery, for example, to flush-suction systems, is likewise practicable and possible.

The object of simple operation and application with a constant flush flow and pressure is solved in that compressed gas (air) is either preferably introduced into the pressurized container or also optionally introduced directly into the flush fluid bag.

With advantage the compressed gas regulation and monitoring are thereby arranged within the mobile flush solution container. Compressed gas generation and supply can, for example, be produced by an in-house source, or also by the device.

The proportioning of concentrate and permeate takes place by means of a concentrate scale and a flush solution container scale, whereby the concentrate scale in the filling station is verified each time the filled concentrate container is hung on.

For this purpose, with advantage the mobile flush solution container also comprises a scale that monitors the filling level and that, for safety reasons, is to be tested automatically by means of a reference weight.

For homogenization and tempering, high-purity or approximately sterile permeate is heated and mixed with metered-in concentrate in a mixing block.

Before the introduction into a sterile flush solution container/bag, a second sterile filtering of the mixed solution takes place.

The cleaning of the system or the germ prevention and reduction are executed by means of the combination of a slightly toxic disinfecting and cleaning agent based on citrate and by heating water, whereby both the primary and also the secondary side of the reverse osmosis are to be disinfected or cleaned, separately from one another, by means of an additional pump also without transmembrane flow.

In principle, all process-relevant data both from the operating computer and the protection computer are thereby acquired and, where appropriate, calculated. The measurement results are sent from the operating computer to the protection computer and from the protection computer to the operating computer. Each computer thereby compares the measurement results with its own and sends back a confirmation.

After the confirmation from the operating and protection computers, the data, together with a checksum, are written into the trend data memory, which can preferably be formed as EPROM, but also as some other storage medium.

The electronics of the mobile flush solution container can be operated by means of rechargeable batteries, and all required parameters and also their deviations, such as for example, weight, temperature and container pressure are displayed on the display of the mobile flush solution container.

Monitoring of the filling, proportionality and temperature, for example, takes place by producing a wireless data exchange between the filling station and the mobile flush solution container.

Further details and advantages are described in the figures depicted in the following.

BRIEF DESCRIPTION OF THE DRAWINGS

FIG. 3a is a view of a transport carriage.

FIG. 3b is a view of a filling station.

FIG. 5a is a side view of a concentrate bag and connectors.

FIG. 5b is a perspective view of the concentrate bag connectors and lines.

FIG. 5c is a cross-sectional view of the bag connector and lines.

FIG. 5d is an end view of the bag connector.

FIG. 5e is a cross-sectional view of the bag connector.

FIG. 5f is an exploded perspective view of the bag protector and bend protection.

FIG. 5g is a partial cross-sectional view of a connector receptacle.

FIG. 5h is a detailed view of the circled area of FIG. 5g.

FIG. 5i is a cross-sectional view of the bag connector and receptacle.

FIG. 5j is a plan view of the concentrate bag.

FIG. 5k is an edge detail of the circumferential bag welding.

FIG. 6 is a diagram of a transition system.

FIG. 7a is a perspective view of a concentrate valve.

FIG. 7b is a schematic cross-sectional view of the concentrate valve in a closed position.

FIG. 7c is a schematic cross-sectional view of the concentrate valve in an open position.

FIG. 8a is a partial perspective view of a container mixing unit.

FIG. 8b is an elevational view of a concentrate bag.

FIG. 8c is a detailed view of the concentrate bag connectors.

FIG. 8d is a schematic diagram showing connection of the concentrate bag to the mixing unit.

FIG. 9a is a schematic drawing of a concentrate bag emptying unit.

FIG. 9b is an exploded perspective view of a drain block.

FIG. 9c is a cross-section of the drain block.

FIG. 9d is another perspective view of the drain block.

DETAILED DESCRIPTION OF PREFERRED EMBODIMENTS

Figure 1:
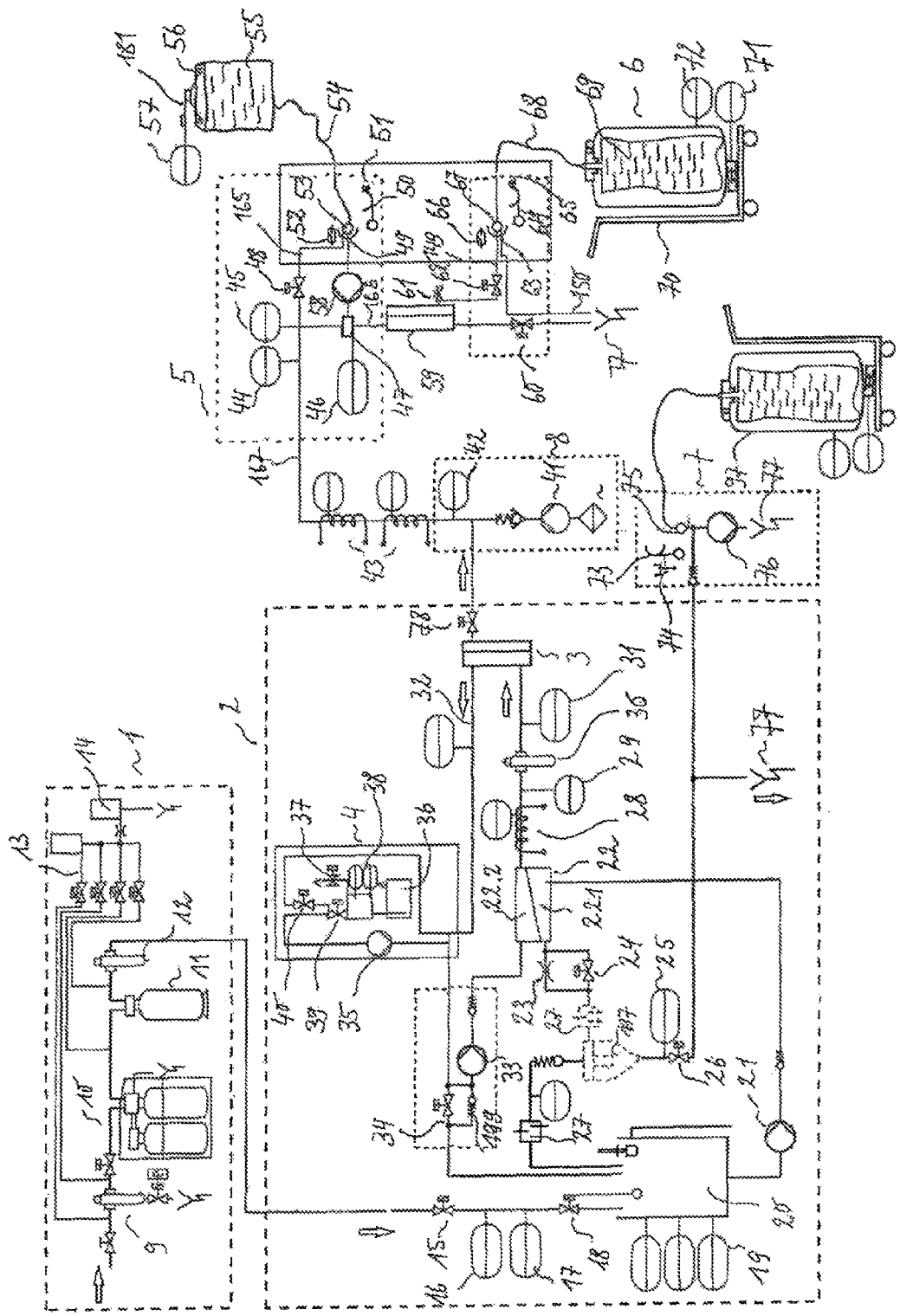
FIG. 1 is a schematic view of a mixing system for ready-to-use flush solutions.

FIG. 1 thereby shows the principal depiction.

At the same time, further embodiments and the remark on possible deviations and expansions are explained in the figure.

The fluid is conducted to the RO system (2) via optional preliminary filtration (1).

For example, the preliminary filtration can be equipped with a coarse filter (9), a softener system (10), a charcoal filter (11) and a fine filter (12). Selectively possible, by means of the valve switch that is shown but not indicated in more detail, is adjustable differential pressure measurement (13) via the individual filtering stages or a measurement of other constituents, e.g., chlorine, by means of the mechanisms (14).

Located in the input area of the RO system (2) are a water input valve (15), an inflow flow meter (16) and an incoming untreated water conductivity measurement (17). The supplied fluid penetrates, via a float-regulated delivery valve (18), into the feed tank (20), which is equipped with filling level sensors for detecting an empty state and with filling level regulation (19).

The float-regulated delivery valve (18) is formed as a membrane servo valve whose servo bore can be closed by means of the lowest lifting forces—consequently very small floater volumes—and that consequently regulates the filling level. Furthermore it is possible by means of a—not depicted—electromagnetic valve to interrupt the servo flow in order in this way to prevent the feed. The fluid can consequently reach the feed tank (20) without appreciable loss of flow.

The feed tank contains an overflow with detection.

The pump (21) conveys the fluid to the RO membrane (22), wherein the retentate is conducted back to the feed tank (20) via the flow throttle (23) with bypass valve (24).

To adjust the degree of efficiency, the drain flow meter (25) is provided, which, together with the untreated water flow meter (16), determines the degree of efficiency calculation.

Surplus retentate volume or the retentate volume determined from the result of the degree of efficiency calculation, as the case may be, is conducted to the drain (77) via the drain valve (26) and discarded.

For a reduction of the particles and germs contained in the retentate flow and for decontamination, an optional centrifugal chamber (197) with cleaning chamber (27) is provided. Particles in the retentate are thereby collected at the bottom of the funnel due to the centrifugal force and from there are directed to the drainage with the drain valve (26) open. For improvement of the flushing process, the valve (24) can be opened cyclically.

Furthermore, by means of the cleaning chamber (27) that acts on the fluid by means of voltage pulses of selectable frequencies or also magnetic field influences, decontamination or influencing of the poorly soluble calcium and magnesium salts is carried out in such a way that deposit of the same on the primary side (22.1) of the membranes can largely be avoided.

The created permeate is registered by the permeate conductivity monitoring (31). Alternatively, a second redundant conductivity measurement cell (46) can also be used.

The permeate that is released by the conductivity measurement cell (31) is conducted through the sterile filter (3) and the permeate release valve (78) to the place of use via link (167).

The permeate recirculation takes place via line (32). The primary side of the filter (3) is thereby completely overflowed and freed of particular residues.

To generate permeate pressure, a pressure retention valve (199) is used with a permeate flushing valve (34). In this way, surplus permeate returns to the feed tank (20).

A chemothermal disinfection begins in that the pump (35) draws in citrate-containing concentrate from the supply canister (36). The valve (39) is thereby open, flush valve (40) and forced venting valve (37) are closed. Venting valve (37) is open in a current-free state and can be executed as a spring-loaded hose pinch valve or also as a globe valve. The filling level sensors (not numbered) affixed to the safety chamber (38) monitor the intake procedure and consequently also the filling level in the supply vessel (36). I.e., in the event disinfection has not been initiated or if the canister (36) is empty, no disinfecting agent is located in the chamber (38).

When the pump (33) is running the disinfecting/cleaning agent is circulated through the permeate collector pipe of the membrane (22) until a predetermined conductivity has been achieved. The conductivity concentration can thereby be monitored via the measuring mechanism (31). It shall be understood that to hold the additional fluid, valves to the drain or to the feed tank are to be temporarily opened. The fluid is preheated to the desired and preset temperature by means of heating unit (28) and regulating sensor (29). A chemothermal disinfection of the entire high-purity secondary area (22.2, 3, 32) or also of the primary area (22.1) is thereby selectively possible.

Where required, heated fluid can be conducted to the primary circuit (22.1) via the open permeate flushing valve (34) in order to achieve the required temperature. As soon as cleaning solution has been conducted into the primary circuit (22.1) of the membrane by means of the disinfection mechanism (4) via the feed tank (20), the transmembrane flow is interrupted. Pump (21) circulates the primary circuit (22.1) and thereby cleans or disinfects all fluid-conducting components.

After the completion of the chemothermal disinfection, a flushing process can be initiated until conductivity cells (31) or (46), as the case may be, report "free of disinfecting agent".

During the flushing process disinfection flush valve (40) is opened in order also to clean the line containing disinfecting agent of the disinfection unit (4).

In order to avoid a subsequent unintentional infeed of disinfecting agent into the permeate circuit (32), the venting valve (37) is opened and the levels in chamber (38) are monitored. Consequently reliable avoidance of unintentional disinfection is guaranteed.

In order to initiate a mixing process permeate, possibly already preheated by the RO system (2) via the heater (43) and temperature regulator (42/44), is heated to the required flush solution temperature. The permeate is supplied via line (167) to a mixing chamber (47) into which concentrate from bag (55) and line (54), the connector (53) and device-side link connector (49) is supplied by means of pump (58).

The concentrate flap (50) is thereby opened, detector (52) reports "open" because magnet (51) has exceeded the required distance. The concentrate flush valve (48) is only opened when the flap (50) is closed and with correspondingly selected or preset flush programs in order to clean the link connector (49).

Concentrate bag (55), with its hangers (56), is hung into the corresponding hooks of the extension piece (181) of the concentrate bag scale (57).

The second conductivity and temperature measurement (46) detects the corresponding values for reasons of redundancy. The flush fluid that has been homogeneously mixed and tempered by the chamber (47) reaches a second sterile filter (59) via line (166). Incorrect flush fluid is discarded to the drain (77) via the bypass valve (60).

With the valve (60) closed and the flush solution release valve (62) open, the flush fluid is directed via the device-side flush solution connector (63), the bag connector (67) connected thereto, line (68), to the mobile flush solution container (6) into which a sterile flush solution bag (69) is loaded. The possibility to remove a flush solution sample volume exists at the sampling point (61).

The mobile flush solution container (6) comprise a scale (71) that registers the respective filling level or the weight of the flush volume. Likewise a thermal sensor (72) is affixed in such a manner that the flush fluid temperature can be indirectly measured.

With the flush solution flap (64) closed and the selection and initiation of a corresponding flush program, the device-side connector (63) is flushed or disinfected with sterile fluid or cleaning solution, respectively, via flush drain (150).

The integrity test of the filters (3/59) takes place with closed flaps (50/64) by means of a filtered air supply by means of air pump (41) and can selectively expose the secondary side of the filter (3) or the primary side of the filter (59) to air by means of a valve switch. The fluid is thereby partially displaced by the air. Due to the hydrophilic character of the filter membrane, given intact filter characteristics, only a very slight pressure drop will result which can be registered or monitored, as the case may be, by means of pressure sensor (45) and electronics (80).

This test can be used to verify or check, as the case may be, both the filters (3/59) and also the tightness of the flaps (50, 64).

The residual flush solution quantities that may be present in the bag (69) after use can be discarded in drain (77) by the connection of the corresponding line of the bag (69) to the emptying spout (75) and the power-up of the pump (76). For this purpose the emptying flap/toggle (73) is opened. By this means, flap switch (74) is activated and it switches pump (76) on.

Figure 2A:
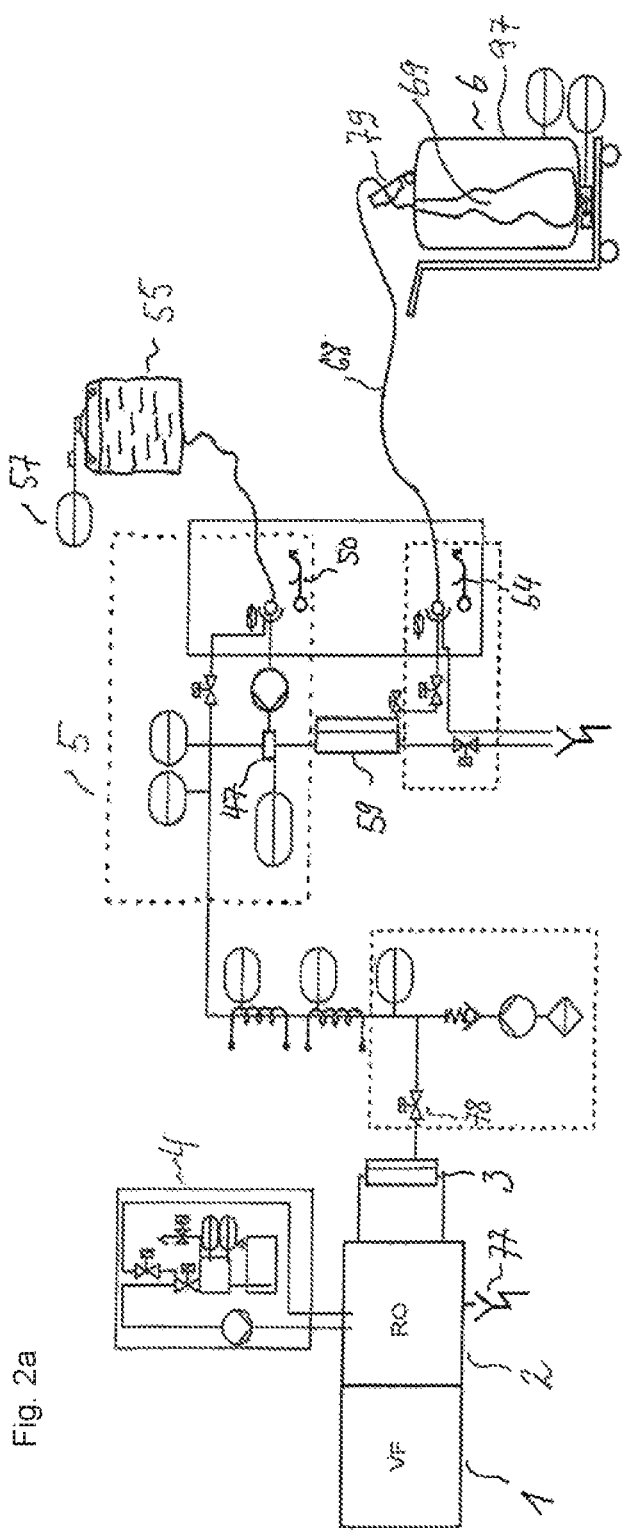
FIG. 2a is a schematic view of a flush solution container mixing system.
Figure 2B:
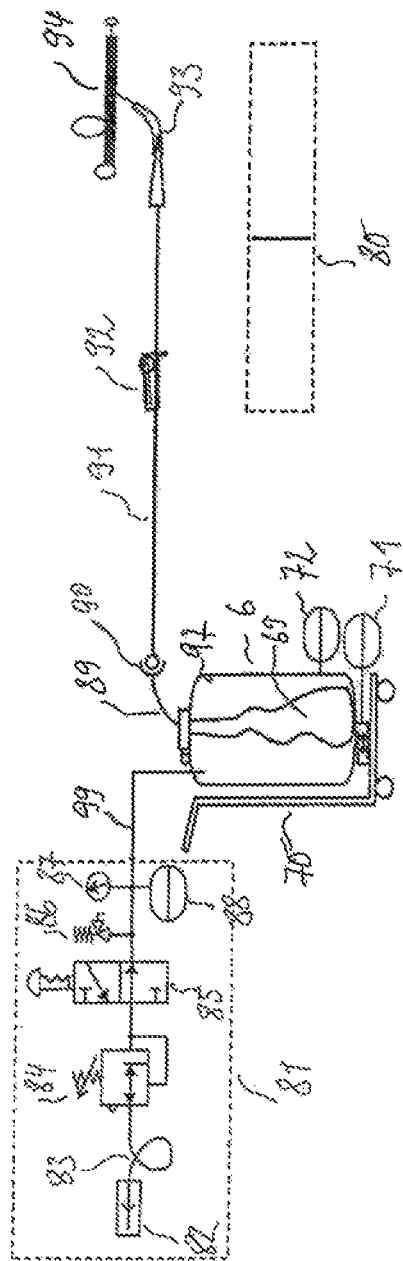
FIG. 2b is a schematic view of an endoscopic system.

FIG. 2 schematically depicts a possible transfer of the flush fluid out of the mobile flush solution container (6) to an endoscopic system or to the surgical place of use (94).

Compressed air connector (82) can be linked to an in-house compressed gas source by means of flexible hose lines (83).

To guarantee a constant flush fluid flow, the pressure regulation unit (81) can include an adjustable pressure regulator (84), an emergency-off with mushroom button and forced venting (85), a manual pressure limiting valve (86), a manometer display (87), and an electronic pressure sensor (88) that, like all sensors and actuators, can be evaluated and depicted by means of redundant electronics (80).

The low-pressure regulating valve (84) is adjustable. The pressure regulation unit (81) is advantageously designed for a regulation range from 0 to 0.5 bar and is adjusted for practical use to 0.3 bar feed pressure, for example, for prostate gland operations. The air regulated in this way is introduced into the pressurized container (97) via hose connection (99).

The flush fluid in bag (69) is conveyed by the fed pressure via transfer link (89) and a suitable transition system (91) to the endoscopic or other system (93) used in surgery.

For the sake of completion, it is ascertained that a further sterile filter, not depicted here, would be connectable between line (89) and the transition system (91).

Likewise it would be possible to introduce the regulated compressed gas medium directly into the flush solution bag (69) or, completely without pressure regulation unit (81) in lieu thereof to convey the flush fluid with a suitable pump to the place of use (94). Likewise an internal air supply is conceivable instead of the external air supply.

FIG. 3 is a three-dimensional illustration of the complete unit of a mixing system and filling station. On the basis of the assumed spatially confined conditions in hospitals, the filling station (95) was designed to be as flat as possible in order not to interfere with the passageways in corridors or in rooms. This requires a vertical construction of the RO system (2) with membrane (22), feed tank (20) and pump (21). Also depicted is a cleaning canister (36).

The mixing unit (5) is affixed above the RO system, whereby in this drawing only the position of the concentrate flap (50), the flush solution flap (64), the heaters (28/43) and the sterile filters (3/59) are indicated in order to illustrate the handling and construction, whereby the flaps (50/64) are depicted here in the closed state.

Concentrate bag scale (57) is mounted underneath the electronics (80) and is depicted in the form of an extension piece (181) with holding hook for the concentrate bag.

Installation is flush with the wall at a suitable location at a corresponding height above the floor in order to guarantee communication, as later explained, and cleaning.

The mobile flush solution container (6) consists of a transport carriage (70) with push and pull handle (102), the pressurized container (97), a lid (79) and an infusion pole (98).

Constituents of the mobile flush solution container (6) are a pressure regulation unit (81), whose outlet discharges directly into the pressurized container (97) via a flexible hose connection (99), and electronics (100) with a communication display (200), for example, for the display of the filling level, temperature, compressed air and other relevant values, and a display light (101).

Communication between the flush solution container (6) and filling station (95) is effected wirelessly by means of sensors in the roller area underneath the bottom plate (103) of the mobile flush solution container (6).

Affixed on the filling station side at the same level underneath the bottom plate of the filling station (95) is a corresponding sensor. The detection of the park or docking positions of the flush solution container (6) at the filling station (95) is given by the position of the preferably infrared sensors.

The further components are explained to some extent from the depiction or are explained later. It shall be understood that shown here is a space-saving construction of the components whose arrangement can differ from that depicted and that is also conceivable in other embodiments. Likewise the labeling has not been referenced in all points.

Figure 4A:
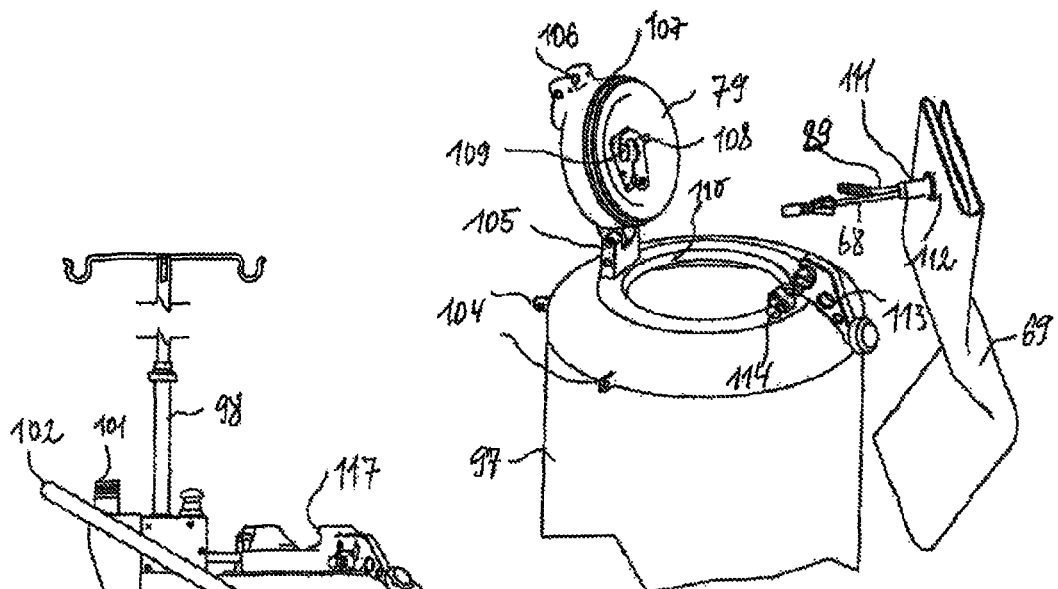
FIG. 4a is a perspective view of a pressurized container with an open lid.
Figure 4B:
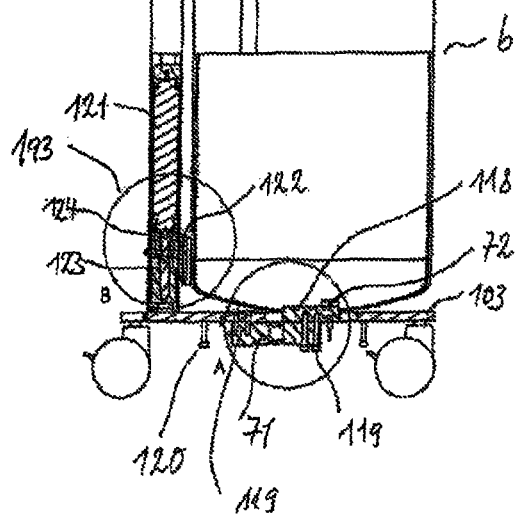
FIG. 4b is a partial cross-sectional view of the transport carriage and container with the lid closed.
Figure 4C:
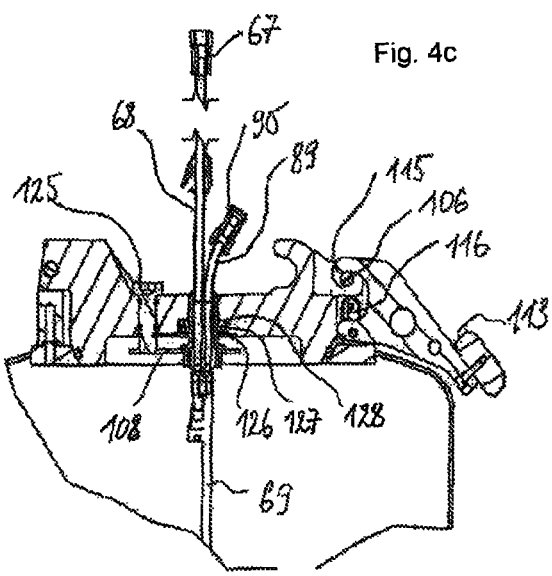
FIG. 4c is a partial cross-sectional view of the container lid.

FIG. 4 schematically shows the transport carriage (6) and the pressurized container (97) with open lid (79) and a connector receptacle (109), through which the cylindrical bag connector (111) is inserted and held by means of movable connector locking device (108) and holding slot (112).

In order for a positive sealing with good sliding properties to be possible between the connector (111) and connector receptacle (109), preferably the seal consists of a Teflon insert (128), which is pressed with an O-ring (127) and a pressure plate (126) against connector (111) in such a manner that the aforementioned objectives are achieved.

A positive and sealing joining of the lid (79) to the pressurized container (97) is achieved on the one hand by lid seal (107) and the conical seal mounting (110) in the pressurized container opening in the closed state.

For closing, hook (115) pulls the lid locking device (106) into position by means of locking device handle (113). Locking device safeguard (114) thereby locks in place behind the pivot joint (116).

Lid clamping hinge (105) holds lid (79) in the open state in an upright position.

It shall be understood that the bag (69) is to be introduced into the container for this purpose.

For vertical support, two lateral guides (104) that are connected with vertical leeway to the chassis (70) are affixed to the pressurized container (97).

The compressed air supply (99) is affixed, for example, in the hinge area.

Connector locking device (108) is to open from outside via a turning shaft (125) by means of a tool in the event of an error.

Likewise, in this figure the filling line (68) is depicted with connector (67), which is to be connected to the link (63) in the filling process. After the filling process, the clamp in the filling line (68) can be closed, the mobile flush solution container (6) is driven to the place of use and the transfer link (89) is to be connected to a corresponding transition system (91). Container (97) is correspondingly acted upon by regulated pressure in order to guarantee continuous, pulsation-free conveyance.

For differentiation between the filling line (68) and the transfer line (89), these are equipped with different connectors and executed, as depicted, in different lengths.

To illustrate the container scale, cut-out A shows a scale cell (71) that is positively connected on the one hand to the stable base part (118) of the container (97) and on the other hand to the bottom plate (103) by means of screws (119).

Cut-out B schematically shows the test mechanism (193) of the scale cell (71). A test weight receptacle (122) is affixed to the pressurized container (97). The spring-loaded plunger (124) of the pulling magnet (123) holds a test weight (121) at a distance to the test weight receptacle (122). The distance to the test weight is canceled in cycles by switching on the pulling magnet (123) so that the full test weight of the scale cell (71) is registered. The position of the temperature sensor (72) as well as a bumper (120) are likewise depicted.

Transport container (6) can be equipped with a rechargeable battery and/or a power supply; likewise, for the heating or loss-free storage of the heated flush fluid, isolation and/or the addition of a heating unit preferably as heating foil is possible.

FIG. 5 thereby schematically shows the flush solution bag (69) which consists of a multi-layer, toxicologically harmless material, preferably PE foil.

The bag (69) has a rectangular, welded contour into which on one side a bag and connector receptacle (142) is welded into the foil in a circular form (143). The connector receptacle (142) is internally radially provided with at least 2 latching teeth (144) into which the connector (111) is pressed in such a manner that a positive, sealing, non-detachable pressing action (145) is created. Connector receptacle (142) is executed with a U-shape and has a collar (189) for the holding slot (112).

In FIG. 5 the connector (111) is executed in two pieces, whereby one-piece, similar geometries are also possible in the framework of the invention. In the depicted version, the connector (111) consists of a front part (130) whose essential constituents are the hose gluing points (133) into which the transfer and filling lines are preferably glued internally and externally, as well as the press-in limit stop (129) and the connector latching teeth (146).

For easier insertion into the connector receptacle (109) of the lid (79) the front part (130) comprises a side-cut (132). Towards the back a receptacle (134) for bend protection (131) of the internal lines (136/137) is provided.

In the installed state, the bag connector (111) is mounted vertically with connector locking device (108) in holding slot (112).

With the lid (79) closed, there is a twisting of the bag (69) by around 90° against the connector (111) and consequently also a positional change of the internal transfer (137) and filling line (136). The bend protection (131) comprises hose guides (135) that should prevent a possible buckling of the same.

The transfer line (137) terminates at the lower end with a hose weight (138), which has on all outer sides contours in order firstly to guarantee complete emptying of the bag when the foil is pressed together and secondly in order to counteract a possible upswing of the transfer line (137).

To avoid contact contamination, the connectors (67) and (90) can comprise protective caps with openings for gassing for the purpose of sterility.

The foils of the bag (69) are circumferentially welded in such a way (147) that a weld head of at least greater than 2 mm is present in order to avoid a rupture.

Already depicted in FIG. 4 is a possible folding of the bag (69) that facilitates simpler insertion into the pressurized container opening (110).

Whereby bag (69) can also be executed in a contour or form other than that depicted in the description.

Furthermore, if an additional pump, not depicted in the figure, is used, circulation of the fluid located in the bag via the two links of the connector (111) can be realized in order to improve or prepare, as the case may be, homogeneity, temperature or a fluid already located in the bag.

Bag (69) or bag connector (111) can also be equipped only with an internal and an external hose that is to be used both as a transfer and a filling hose if no hygiene or sterility requirements preclude this.

FIG. 6 shows the diagram of a transition system (91) which with its connector (140) can be adapted to the transfer link (90) and to which the conical link piece (139) or a silicon hose piece (93) following the same can be linked to an endoscopy or also flush system common in surgery.

The cone (139) facilitates the receiving of different silicon hose diameters (93) in order to link different systems used in surgery.

The hose clip (92) can advantageously also be executed as a roller clamp for the regulation of the flush flow.

The length of the transition system (91) is arbitrary and its diameter should be adapted to the desired flush flow, whereby an internal hose diameter of approximately 7 mm was selected for the shown system.

For reasons of sterility link (140) was equipped with a gasable cap (141).

FIG. 7 offers a perspective schematic view of the flush solution flap (64), whose opening, closing and excavation and cleaning process are described in the following.

Located in the flap (64) is a magnet (65) that activates a magnetic contact (66) when the flap (64) is closed.

For flushing, the flap (64) is closed so that the flap locking device hook (162) of the flap locking device (161) snaps into place in the locking collar (163) of the link connector (63).

By pressing back the locking device (161) over the pivot point (158) by means of flap locking device handle (160) the locking device spring (159) is compressed and the flap locking device hook (162) thereby releases the excavation process of the flap (64). The flap swivels upwards.

This is supported by an excavation spring (156) which engages to the side of the flap pivot point (155).

For complete flushing of the connector (63), the seal (157) presses in a positive fit onto the outer cone (164) of the connector (63) when the flap is closed.

Via link (149) via the internal cone (154) the flush fluid penetrates to the flushing area (153) and from there via the circumferentially arranged flush bores (151) of the connector (63) into the annular gap (152) from which the flush drain (150) procedure takes place.

To rule out mix-ups during use, the technical execution of the flush solution links was designed to be different than those for the concentrate links.

The flush solution connector (63) is, for example, executed with an internal cone (154) 1 to 16 and a double-threaded external screw thread 13×8. Located on the flush solution bag (69), which is executed as a disposable article, is the filling line (68) with disposable connector (67) which as a male connector is equipped, for example, with freely rotatable union nut with internal screw thread 13×8 and an internal outer cone 1 to 16 in such a way that in the coupled state a positive, sealing joining is guaranteed by the two cones and screw thread. A hose clip can be mounted in the filling line (68).

FIG. 8 schematically shows thereby the concentrate bag (55) that is made of a toxicologically harmless material, preferably PE foil.

The bag (55) has a rectangular welded contour.

Bag fillings of approximately 1-5 liters can cover the concentrates used in surgery and their formulas for the production of the required flush solution.

To link to the device-side connector (49) the link hose (54) can be executed in different lengths. Bag (55) is hung into the extension piece (181) with its hang-in openings (56). Extension piece (181) has a Z-shaped bending and is mounted by means of screws (180) to bending bar (178) for reinforcement and positive connection with outbreak (179). The bending bar (178) is screwed with its rear end to a support arm (176) that for its part can be adjustably connected to the back wall (175) of the filling station (95) by means of adjustment screw (177).

It shall be understood that at the beginning of the mixing process the sterile protection cap (174) is to be removed and the breaking cone (198) is to be broken. Filling link (172) is welded.

The function of the concentrate flap (50) as well as also the concentrate supply from bag (55) via pump (58), the mixing process and the flush process have already been described in FIG. 1. The flap function is the same as the already described function of the flush flap.

FIG. 9 schematically and in perspective shows the emptying of the flush solution bag (69) and the construction of the drain block (185).

All together the drain block (185) contains four drains, all of which discharge into a siphon/drain (77). Drain channel (182) is used to collect residual fluids that could have developed during the connecting of the bags or the opening of the flaps.

To avoid thermal or chemical burns during chemical disinfection, a splash guard (186) can be hooked into the channel (182) in such a manner that the drains are covered but that residue sampling is possible through the test opening (187). Discernible in the sectional view is the emptying flap (73) that is affixed to a turning shaft (191) by means of a pinned fitting (192). The emptying flap (73) comprises a blind hole with internal seal (190). In the closed state of the flap (73), the seal frontally lies on the emptying spout (75). For opening, the flap (73) is pulled forwards and swiveled upwards. As a result, the switch cam (195) of the emptying switch (196) is freed and pump (184) begins to draw. At the same time, return spring (194) is pre-tensioned because in the swiveled-out state flap (73) contains a stop position that holds the turning shaft (191) at a distance to the switch cam (195).

For closing and ending the emptying process, flap (73) is placed back into its original position. Return spring (194) positions the seal (190) in a positive fit on the spout (75). At the same time, switch (196) or switch cam (195) is re-activated.

| Legend | |
|---|---|
| 1. | Preliminary filtration |
| 2. | RO system |
| 3. | Permeate ultra/sterile filter 1 |
| 4. | Disinfection unit |
| 5. | Mixing unit |

-continued

| | Legend |
|---|---|
| 6. | Transport carriage |
| 7. | Emptying |
| 8. | Air pressure infeed |
| 9. | Coarse filter |
| 10. | Softener |
| 11. | Charcoal filter |
| 12. | Fine filter |
| 13. | Pressure measurement |
| 14. | Chlorine/calcium measurement |
| 15. | Water input valve |
| 16. | Flow meter |
| 17. | Conductivity/temperature display |
| 18. | Float valve |
| 19. | Level sensor |
| 20. | Feed tank |
| 21. | Pressurization pump |
| 22. | RO membrane |
| 22.1 | Primary side |
| 22.2 | Secondary side |
| 23. | High pressure throttle |
| 24. | Bypass valve |
| 25. | Drain flow meter |
| 26. | Drain valve |
| 27. | Cleaning chamber |
| 28. | Heating unit for permeate circuit with overtemperature protection |
| 29. | Temperature regulator |
| 30. | Permeate improvement |
| 31. | Conductivity measurement cell |
| 32. | Permeate circuit |
| 33. | Permeate circulation pump |
| 34. | Permeate flushing valve |
| 35. | Disinfecting agent pump |
| 36. | Disinfecting agent canister |
| 37. | Vent valve |
| 38. | Safety chamber with level detectors |
| 39. | Disinfection release valve |
| 40. | Disinfection flush valve |
| 41. | Compressed air pump |
| 42. | Temperature regulator |
| 43. | Heating unit with overtemperature protection |
| 44. | Temperature regulator |
| 45. | Pressure sensor |
| 46. | Redundant conductivity/temperature measurement |
| 47. | Mixing chamber |
| 48. | Concentrate flush valve |
| 49. | Device-side concentrate link connector |
| 50. | Concentrate link flap |
| 51. | Magnet |
| 52. | Magnetic sensor |
| 53. | Concentrate bag connector with breaking cone with double-thread external screw thread and internal cone |
| 54. | Concentrate link line |
| 55. | Concentrate bag |
| 56. | Suspension eyes |
| 57. | Concentrate scale |
| 58. | Concentrate pump |
| 59. | Sterile filter 2 |
| 60. | Flush solution by-pass valve |
| 61. | Sampling point valve |
| 62. | Flush solution release valve |
| 63. | Device-side flush solution link connector |
| 64. | Flush solution flap |
| 65. | Magnet |
| 66. | Magnetic sensor |
| 67. | Flush solution bag link connector |
| 68. | Filling line |
| 69. | Flush solution bag |
| 70. | Chassis |
| 71. | Flush solution container scale |
| 72. | Temperature sensor |
| 73. | Emptying flap/toggle |
| 74. | Flap detector |
| 75. | Emptying link |
| 76. | Emptying pump |
| 77. | Drain |
| 78. | Permeate release valve |
| 79. | Lid of flush solution container |
| 80. | Electronics |
| 81. | Pressure regulation mechanism |
| 82. | Compressed air connector |
| 83. | Hose extension |
| 84. | Pressure regulator |
| 85. | Emergency-off with venting |
| 86. | Pressure limiting valve |
| 87. | Manometer |
| 88. | Pressure sensor |
| 89. | Transfer line |
| 90. | Transfer connector |
| 91. | Transition system |
| 92. | Clamp |
| 93. | Link for surgical devices |
| 94. | OP area |
| 95. | Filling station |
| 96. | Display keyboard/printer |
| 97. | Pressurized container |
| 98. | Infusion pole |
| 99. | Compressed air connection hose |
| 100. | Transport carriage electronics with display |
| 101. | Signal light |
| 102. | Push handle |
| 103. | Bottom plate |
| 104. | Lateral stabilization for pressurized container |
| 105. | Clamping hinge for lid |
| 106. | Lid locking device |
| 107. | Lid seal |
| 108. | Bag connector locking device |
| 109. | Connector receptacle with internal slide ring seal |
| 110. | Container opening with conical seal seat |
| 111. | Bag connector |
| 112. | Bag connector slot |
| 113. | Locking device handle |
| 114. | Locking device safeguard |
| 115. | Locking device handle hook |
| 116. | Pivot joint |
| 117. | Lid lifting handle |
| 118. | Pressurized container bottom plate |
| 119. | Mounting screws |
| 120. | Transport safety bolt |
| 121. | Test weight |
| 122. | Test weight receptacle |
| 123. | Pulling magnet |
| 124. | Lifting spring |
| 125. | Turning shaft locking device with hexagonal socket |
| 126. | Pressure plate |
| 127. | O-ring |
| 128. | Teflon insert |
| 129. | Bag connector limit stop |
| 130. | Bag connector front part |
| 131. | Bag connector bend protection |
| 132. | Connector insertion chamfer |
| 133. | Hose gluing points |
| 134. | Bend protection receptacle |
| 135. | Hose guide |
| 136. | Internal filling line with optional non-return valve |
| 137. | Internal transfer line |
| 138. | Weight |
| 139. | Cone, corrugated (5-10 mm) |
| 140. | Patient connector with union nut |
| 141. | Gassing cap/protection against contact |
| 142. | Connector receptacle |
| 143. | Circular point at which foil is welded on |
| 144. | Connector receptacle latching teeth |
| 145. | Connector pressing |
| 146. | Bag connector latching teeth |
| 147. | Circumferential bag welding |
| 148. | Bag lettering |
| 149. | Flush solution line |
| 150. | Flush solution flush line |
| 151. | Circumferential flush solution bore |
| 152. | Annular gap |
| 153. | Flushing area |
| 154. | Flush solution connector internal cone |
| 155. | Flap pivot point |

-continued

| | Legend |
|---|---|
| 156. | Excavation spring |
| 157. | Flap seal |
| 158. | Locking device pivot point |
| 159. | Locking device return spring |
| 160. | Locking device handle |
| 161. | Locking device |
| 162. | Flap locking device hook |
| 163. | Locking collar |
| 164. | Seal counter-bearing |
| 165. | Concentrate flush line |
| 166. | Flush solution line |
| 167. | Permeate supply line |
| 168. | Concentrate flap excavation spring |
| 169. | Concentrate flap pivot point |
| 170. | Concentrate flap locking device |
| 171. | Concentrate flap locking collar |
| 172. | Filling link |
| 173. | Lettering |
| 174. | Sealing cap |
| 175. | Filling station back wall |
| 176. | Extension piece mounting for scale cell |
| 177. | Adjustment screw for scale cell |
| 178. | Scale cell bending bar |
| 179. | Outbreak |
| 180. | Mounting screws |
| 181. | Concentrate scale extension piece with bag hanging hooks |
| 182. | Channel |
| 183. | Siphon link |
| 184. | Emptying pump |
| 185. | Drain block |
| 186. | Splash guard |
| 187. | Sampling opening |
| 188. | Connection spout for emptying pump |
| 189. | Collar for holding slot |
| 190. | Emptying spout seal |
| 191. | Emptying flap turning shaft |
| 192. | Turning shaft mounting protection |
| 193. | Scale cell test mechanism |
| 194. | Return spring for emptying flap |
| 195. | Switch cam |
| 196. | Emptying switch |
| 197. | Centrifugal chamber |
| 198. | Breaking cone |
| 199. | Permeate pressure retention valve |
| 200. | Mobile flush solution container display |

The invention claimed is:

1. Mixing system for ready-to-use flush solutions, the mixing system comprising:
an RO system (2), a mixing unit (5) that is connected to the RO system (2) and contains a mixing chamber (47), to which high-purity water can be fed from the RO system (2) and flush solution concentrate can be fed from a concentrate source (55), and a flush solution link connector (63), wherein the RO system (2) and the mixing unit (5) form a filling station (95), and
a mobile flush solution container (6) comprising a transport carriage (70) and a pressurized container (97) arranged on the transport carriage, the pressurized container receiving a flush solution bag (69) that can be coupled to the flush solution link connector (63) of the mixing unit (5), and a computer and control mechanism (80) for all measurement and monitoring tasks during the local production of a flush solution,
wherein the transport carriage and the filling station (95) are provided with sensors by means of which wireless communication is made possible between the transport carriage and the filling station (95), wherein a park or docking position of the transport carriage at the filling station is given by the sensors.

2. Mixing system according to claim 1,
wherein the sensors are affixed underneath the bottom plate (103) of the transport carriage (70) and at the same level underneath the bottom plate of the filling station (95).

3. Mixing system according to claim 1,
wherein the sensors are infrared sensors.

4. Mixing system according to claim 1,
wherein the RO system (2) has a disinfection unit (4) with a pump (35) that is connected to the secondary circuit of the RO membrane (22) and whose disinfecting and cleaning agents can also be distributed into the primary circuit.

5. Mixing system according to claim 1,
wherein a permeate supply line (167) of the mixing unit (5) is connected to the secondary side of a permeate sterile filter (3) of the RO system (2) and has a permeate release valve (78).

6. Mixing system according to claim 1,
wherein the concentrate source has a concentrate bag (55) that is connected to a concentrate scale (57).

7. Mixing system according to claim 1,
wherein the concentrate bag (55) can be connected to a device-side concentrate link connector (49) via a concentrate bag connector (53).

8. Mixing system according to claim 1,
wherein the flush solution container contains a flush solution bag (69) that is arranged in the pressurized container (97).

9. Mixing system according to claim 1,
wherein the flush solution bag (69) can be connected to the device-side flush solution link connector (63) via a flush solution link connector (67).

10. Mixing system according to claim 1,
wherein the device-side link connectors (49, 63) have link flaps that are connected into the disinfection circuits.

11. Mixing system according to claim 1,
wherein the pressurized container (97) is arranged on the transport carriage (70) that contains a flush solution container scale (71) and a temperature sensor (72).

12. Mixing system according to claim 1,
wherein the flush solution bag (69) is provided with a transfer line (89) and a transfer connector (90) for connection to a transition system (91) that contains a link for a surgical device.

13. Mixing system according to claim 1,
wherein the flush solution bag (69) can be connected to a link connector of a drain block (185) via a filling line (68).

* * * * *